US00RE35914E

United States Patent [19]

Aoyama

[11] E Patent Number: Re. 35,914

[45] Reissued Date of Patent: Oct. 6, 1998

[54] PARTS FEEDING DEVICE

[76] Inventor: Yoshitaka Aoyama, 20-11, Makitsukadai 2-cho, Sakai-shi, Osaka 590-01, Japan

[21] Appl. No.: 738,295

[22] Filed: Oct. 25, 1996

Related U.S. Patent Documents

Reissue of:

[64] Patent No.: 5,359,171
Issued: Oct. 25, 1994
Appl. No.: 837,889
Filed: Feb. 20, 1992

[30] Foreign Application Priority Data

Feb. 23, 1991 [JP] Japan ..... 3-114181

[51] Int. Cl.[6] ..... B23K 11/14; B23Q 7/04

[52] U.S. Cl. ..... 219/93; 221/212; 221/262

[58] Field of Search ..... 219/86.24, 86.25, 219/86.7, 86.8, 93, 119, 120; 221/212, 239, 262, 211, 186, 187, 188, 189, 190; 29/743, 744; 81/125

[56] References Cited

U.S. PATENT DOCUMENTS

| | | | |
|---|---|---|---|
| 3,089,613 | 5/1963 | Glocker | 221/262 |
| 3,114,477 | 12/1963 | Dixon | 221/262 |
| 3,494,393 | 2/1970 | Casanov | 221/212 |
| 4,943,098 | 7/1990 | Aoyama | 221/212 |
| 5,007,795 | 4/1991 | Yoshimura | 221/212 |
| 5,044,519 | 9/1991 | Aoyama | 221/212 |
| 5,067,763 | 11/1991 | Aoyama | 221/212 |
| 5,146,062 | 9/1992 | Koda et al. | 219/93 |
| 5,248,058 | 9/1993 | Aoyama | 221/212 |
| 5,285,929 | 2/1994 | Aoyama | 221/212 |

FOREIGN PATENT DOCUMENTS

| | | | |
|---|---|---|---|
| 2446137 | 6/1980 | Germany . | |
| 144222 | 10/1980 | Germany . | |
| 3726579 | 2/1989 | Germany . | |
| 60-99490 | 6/1985 | Japan | 219/86.24 |
| 1-266974 | 10/1989 | Japan | 219/119 |
| 3-210976 | 9/1991 | Japan | 219/86.24 |
| 2225974 | 6/1990 | United Kingdom . | |
| 2244445 | 4/1991 | United Kingdom . | |

*Primary Examiner*—Geoffrey S. Evans
*Attorney, Agent, or Firm*—Pollock, Vande Sande & Priddy

[57] ABSTRACT

A part is kept on standby so that it can be reliably held by a feed rod. An auxiliary feed rod is provided with an arrangement for holding a part at a fixed position in advance. The part is stopped on the advance and retraction axis of a main feed rod by the advance movement of the auxiliary feed rod where the part transferred and is held on the main feed rod.

4 Claims, 4 Drawing Sheets

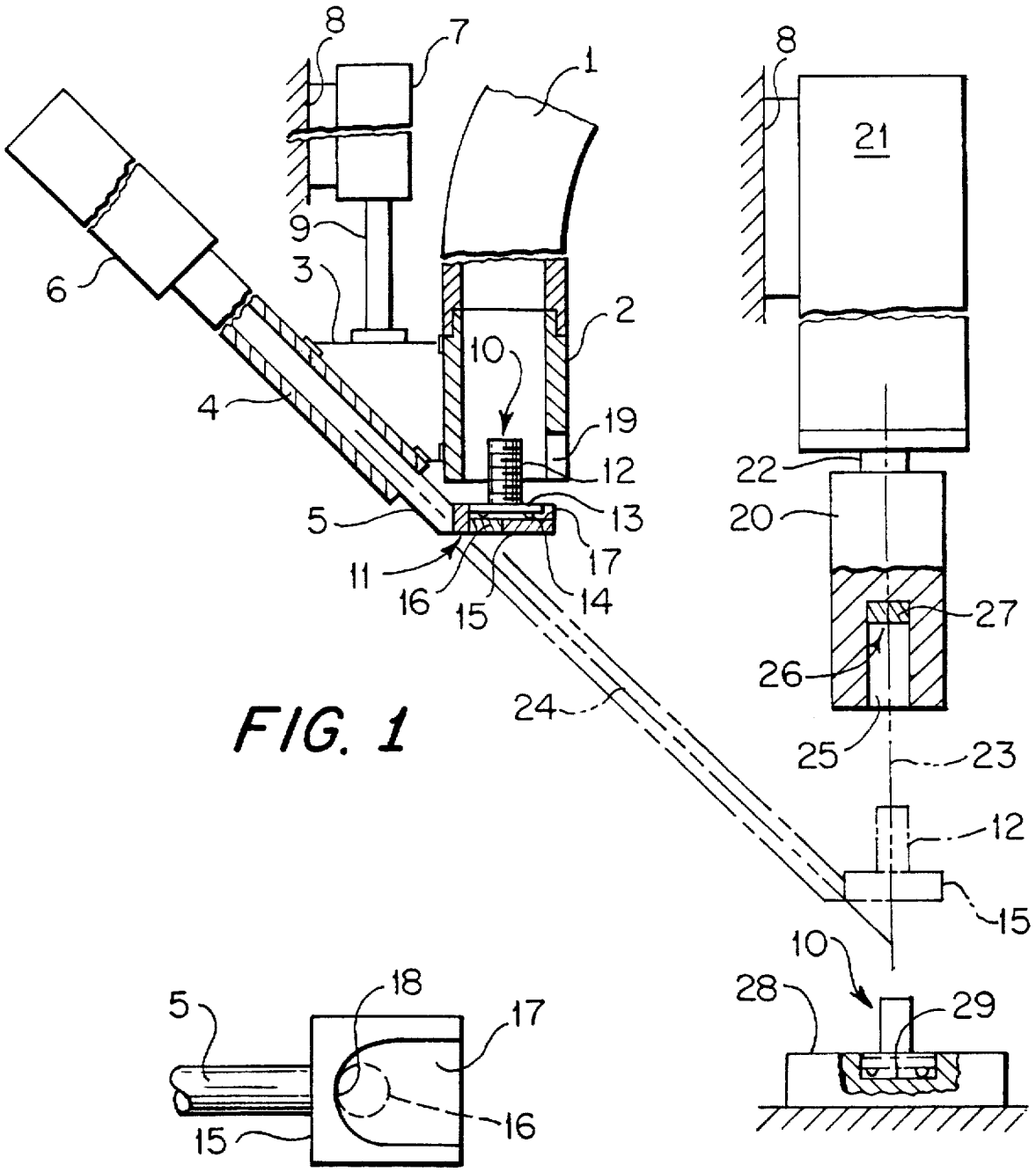
FIG. 1
FIG. 2
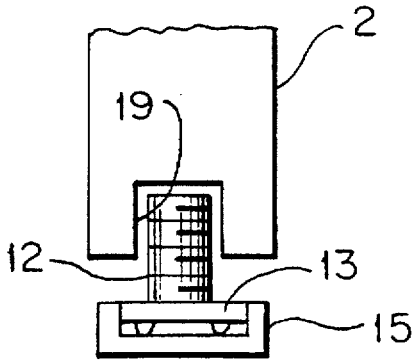
FIG. 3

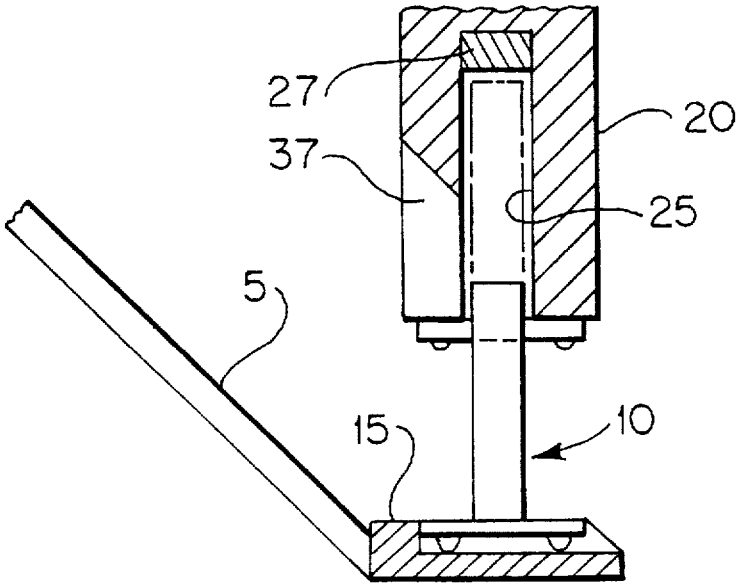
FIG. 6
FIG. 7
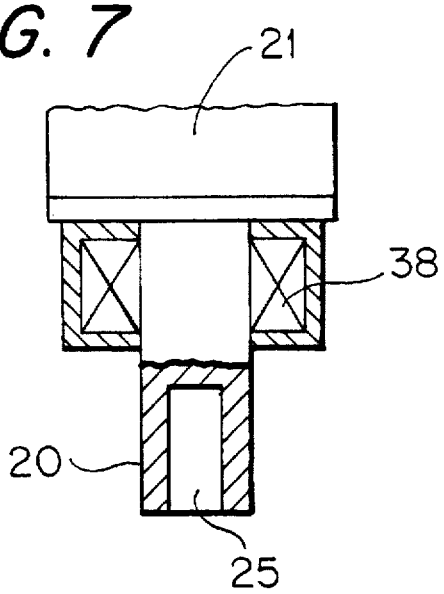
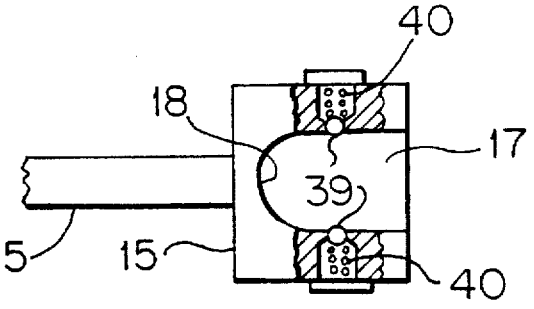
FIG. 8
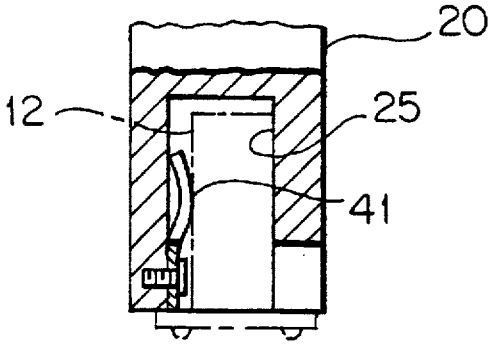
FIG. 9

PARTS FEEDING DEVICE

Matter enclosed in heavy brackets [ ] appears in the original patent but forms no part of this reissue specification; matter printed in italics indicates the additions made by reissue.

BACKGROUND OF THE INVENTION

As for a prior art, there is an advance and retraction type feed rod, which is provided at its front end with parts holding means comprising a hole or chuck mechanism, said rod including a mechanism disposed on the axis thereof for temporarily locking a part, such as a bolt, coming from a parts feeder or the like, said rod being advanced toward said part in the locked state and, with said holding means holding the part, conveying the part to an intended place.

According to the prior art described above, a single mechanism has to perform two functions at the same time; first, it has to stop a part conveyed from a parts feeder or the like-through a feed hose and must be stopped accurately on the axis of the feed rod, and second, the stopped position must be reliably maintained. Therefore, such mechanism is necessarily of high precision, and even a slight decrease in precision would upset the correct engagement between the holding means of the feed rod and a part, causing the problem of the part falling off. Further, if the mechanism for temporarily locking a part is present on the axis of the feed rod all the time, this limits the installation space therefor to a great extent, and hence the device is increased in size, making it difficult to install it in a narrow space.

SUMMARY OF THE INVENTION

The present invention has been presented to solve the problems described above, and the invention is characterized in that disposed on the advance and retraction axis of a main feed rod adapted to advance and retract is an auxiliary feed rod, said main feed rod being formed with a parts receiving hole, said auxiliary feed rod having attached thereto means for holding a part at a fixed position, said main feed rod being provided with means for holding a part positioned by the auxiliary feed rod when the latter is advanced. It is arranged so that a part is held in advance at a fixed position in the auxiliary feed rod, and the auxiliary feed rod is advanced until the part stops on the advance and retraction axis of the main feed rod, then either the main feed rod is advanced thereto or the auxiliary feed rod is moved toward the main feed rod, whereby the part is held by the main feed rod, and in this state the main feed rod is advanced to convey the part to an intended place.

The main feed rod is a movable electrode for a projection welding machine. It is arranged so that the main feed rod holding a part is advanced to reach an intended place, whereupon an electric current is passed to effect welding. The advance and retraction axis of the main feed rod crosses the advance and retraction axis of the auxiliary feed rod at an acute angle. It is arranged that the auxiliary feed rod is obliquely advanced to convey a part onto the advance and retraction axis of the main feed rod. Either or both of the means of the auxiliary feed rod for holding a part at a fixed position and the means of the main feed rod for holding a part are provided with magnets. The attractive forces of the magnets enable the respective functions to be performed. An arrangement is added whereby either the auxiliary feed rod alone or both the auxiliary feed rod and a parts feeding tube are adapted to advance and retract along the advance and retraction axis of the main feed rod. A part held at a fixed position on the auxiliary feed rod is transferred to the main feed rod and held there. A driving mechanism is provided so that after a part has been inserted into a parts receiving hole either by the movement of the auxiliary feed rod along the advance and retraction axis of the main feed rod or by the advance movement of the main feed rod, the auxiliary feed rod is moved away from the advance and retraction axis of the main feed rod. When a part is inserted into the receiving hole, the auxiliary feed rod is moved, e.g., horizontally, from that position so as to hasten the start of the main feed rod.

BRIEF DESCRIPTION OF THE DRAWINGS

FIG. 1 is a side view, partly in longitudinal section, showing an entire device:

FIG. 2 is a plan view of a support plate;

FIG. 3 is a front view of a parts feeding tube;

FIG. 6 is a side view, in longitudinal section, showing a modified example of a main feed rod;

FIG. 7 is a side view, in longitudinal section, of a main feed rod wherein an electromagnet is utilized;

FIG. 8 is a plan view of a support plate;

FIG. 9 is a side view, in longitudinal section, showing a modified example of a main feed rod;

DESCRIPTION OF THE PREFERRED EMBODIMENTS

Figure 4:
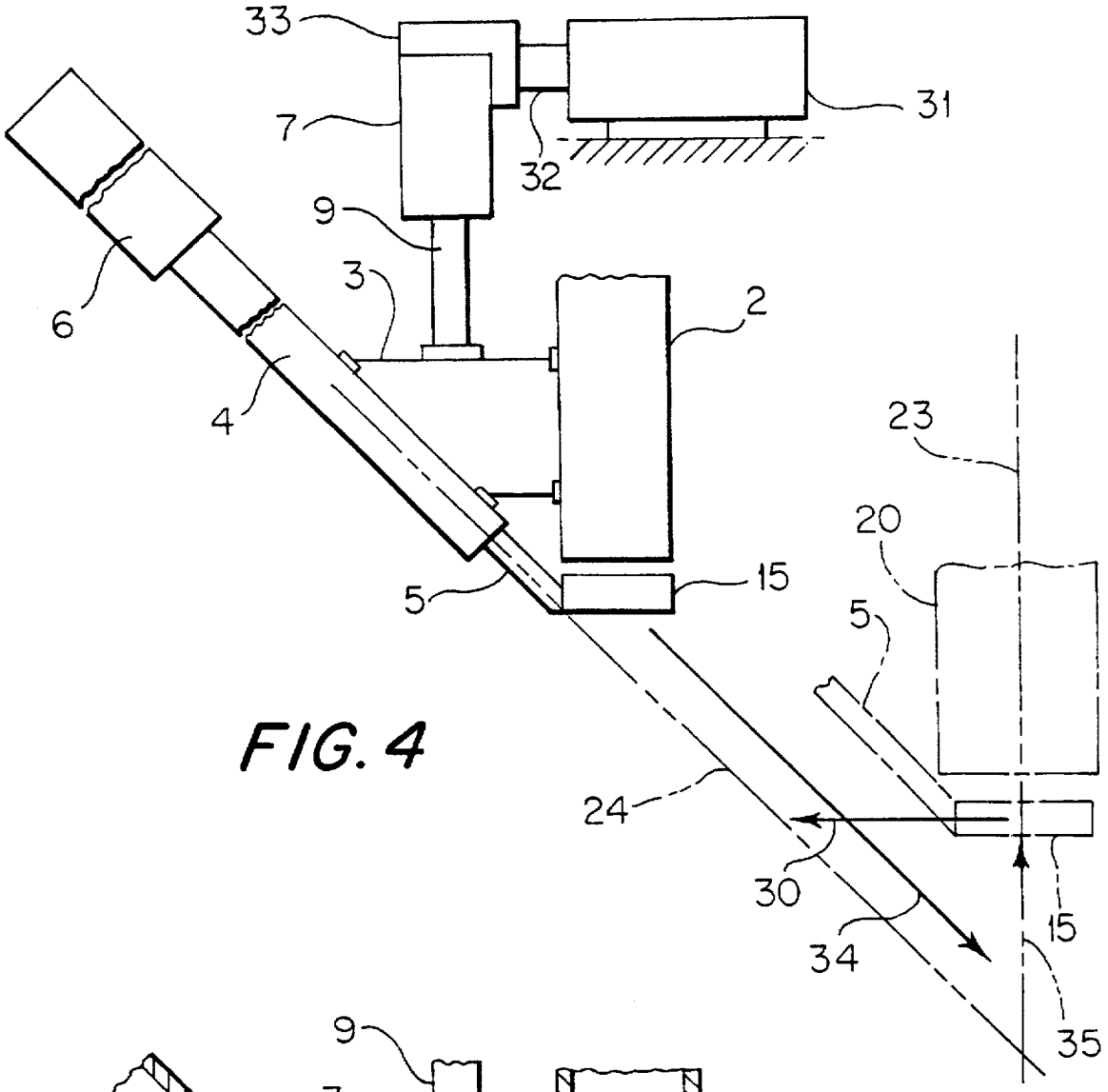
FIG. 4 is a side view showing another embodiment.

First, an embodiment shown in FIGS. 1 through 3 will be described. A pliable part feeding hose 1 extending from a parts feeder (not shown) is connected to a parts feeding tube 2. A guide tube 4 is welded to a bracket 3 welded to the parts feeding tube 2, and an auxiliary feed rod 5 extends through said guide tube 4 so that it is free to advance and retract. The auxiliary feed rod 5 is advanced and retracted by an air cylinder 6 connected to the guide tube 4. An air cylinder 7 is firmly fixed to a stationary member 8, with its piston rod 9 joined to the bracket 3, enabling the parts feeding tube 2 and auxiliary feed rod 5 to advance and retract as a unit, the direction of advance and retraction thereof being parallel with the advance and retraction axis of the main feed rod.

The auxiliary feed rod 5 is provided with means 11 for holding a part 10 at a fixed position. The part 10 in this case is a projection bolt comprising a stem portion 12, a flange 13 and projections 14 for welding. Various forms may be thought of as said means 11, but herein illustrated is a magnet 16 built in a support plate 15 integral with the auxiliary feed rod 5. The auxiliary feed rod 5 is inclined at about 45 degrees with respect to the vertical line, as shown, and the support plate 15 is horizontally installed. A recess 17 formed in the support plate 15 is opened at the right side, as shown in FIGS. 1 and 2, and has an arcuate portion 18 at the left side adapted to coincide with the circular flange 13. Further, the support plate 15 has a magnet 16 embedded therein at a position deviated toward the arcuate portion 18, thereby ensuring that the outer periphery of the flange 13 exactly coincides with the arcuate portion 18. In addition, the magnet 16 in this case is a permanent magnet, and in order to enable its magnetic force to act on the part 10 more strongly, the auxiliary feed rod 5, support plate 15 and parts feeding tube 2 are made of stainless steel. The parts feeding tube 2 is formed with a notch 19 to allow the stem portion 12 to pass therethrough.

The main feed rod 20 is joined to the piston rod 22 of an air cylinder 21 firmly fixed to the stationary member 8. The advance and retraction axis 23 of the main feed rod 20 is vertically disposed, crossing the advance and retraction axis 24 of the auxiliary feed rod 5 at an acute angle. The main feed rod 20 is formed with a parts receiving means 26, which in this case is a magnet (permanent magnet) 27 fixed in the innermost region of the receiving hole 25, as shown.

A mating part 28 has a recess 29 and the part 10 is inserted in the recess 29, i.e.. the intended place. In addition, air hoses for operating air are connected to the air cylinders but they are omitted from illustration, and sensors and air switching control valves for sequence operation employed therein are known and hence a description thereof is omitted.

The operation of the above embodiment will now be described. FIG. 1 shows the main and auxiliary feed rods 20 and 5 at their standby positions which are the most retracted positions. When a part 10 is fed to the parts feeding tube 2, its flange fits in the recess 17 as it is attracted by the magnet 16 until the outer peripheral surface of the flange 13 exactly coincides with the arcuate portion 18. Thereby, it is correctly positioned on the support plate 15, with the result that the part 10 is held at the fixed position on the auxiliary feed rod 5. Then, the auxiliary feed rod 5 is advanced until the stem portion 12 of the part 10 coincides with the advance and retraction axis 23, whereupon the air cylinder 7 is actuated to move the auxiliary feed rod 5 upward; therefore, the stem portion 12 enters the receiving hole 25, with the part 10 held on the main feed rod 20. Thereafter, the auxiliary feed rod 5 is moved downward, retracted rearwardly upward, and returned to the position shown in FIG. 1. Then, the main feed rod 20 is moved downward until the flange 13 is pushed in to the recess 29, whereupon the feeding of a part is completed, with the main feed rod 20 returning to the solid line position. In addition, the attractive force of the magnet 27 is set at a value greater than the attractive force of the magnet 16, so that when the auxiliary feed rod 5 is moved downward, the part 10 remains in the receiving hole 25. Further, though not shown, the parts feeding tube 2 may be fixed to the stationary member, with the auxiliary feed rod 5 alone being adapted to be advanced and retracted along the advance and retraction axis by the air cylinder 7.

An embodiment shown in FIG. 4 is designed so that when a part 10 is inserted into the receiving hole 25, the auxiliary feed rod 5 is moved from that position as indicated by an arrow 30 to hasten the time of advance of the main feed rod 20 even a little. When it is moved in the direction of the arrow 30, the flange 13 leaves the recess 17 at its open side. To obtain such movement in the direction of arrow 30, there is provided an air cylinder 31 fixed to the stationary member 8 and its piston 32 is adapted to move in parallel with the arrow 30 and is fixed to the air cylinder 7 through a connector 33. In addition, the arrows 34 and 35 indicate the same directions of movement as described above.

Figure 5:
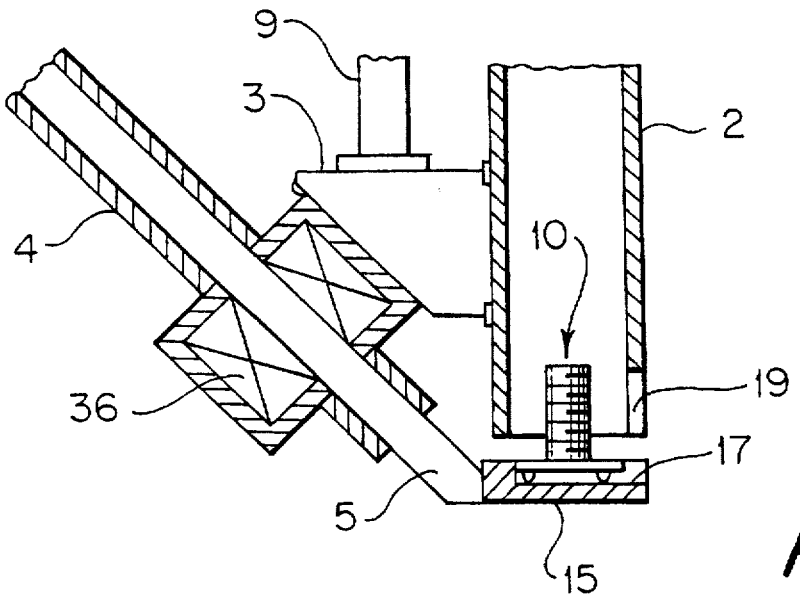
FIG. 5 is a side view, in longitudinal section, of an auxiliary feed rod wherein an electromagnet is utilized.

FIG. 5 shows the use of an electromagnet in the place of the magnet 16 of FIG. 1. The auxiliary feed rod 5 extends through a solenoid 36, said rod 5 being made of iron, which is a magnetic material, while the guide tube 4 will suitably be made of stainless steel.

FIG. 6 shows a slot 37 formed in the main feed rod to allow the stem portion 12 of a part to pass therethrough. This arrangement decreases the distance of upward travel of the auxiliary feed rod 5 even a little and shortens the processing time.

FIG. 7 shows the use of an electromagnet in the place of the magnet 27 of FIG. 1. The main feed rod 20 extends through a solenoid 38, said rod being made of magnetic material, and a part 10 entering the receiving hole 25 is held by the electromagnet.

FIG. 8 shows a modified example of means installed on the auxiliary feed rod for holding a part at a fixed position, wherein balls 39 are exposed from the recess 17 as they are urged by coil springs 40. Therefore, since the flange 13 is subjected to the elastic force from the balls 39 on its outer periphery, it closely contacts the arcuate portion 18, whereby positioning is effected.

FIG. 9 shows a modified example of means installed on the main feed rod for holding a part, wherein a plate spring 41 is fixed in the receiving hole 25 to thereby hold the stem portion 12.

Figure 10:
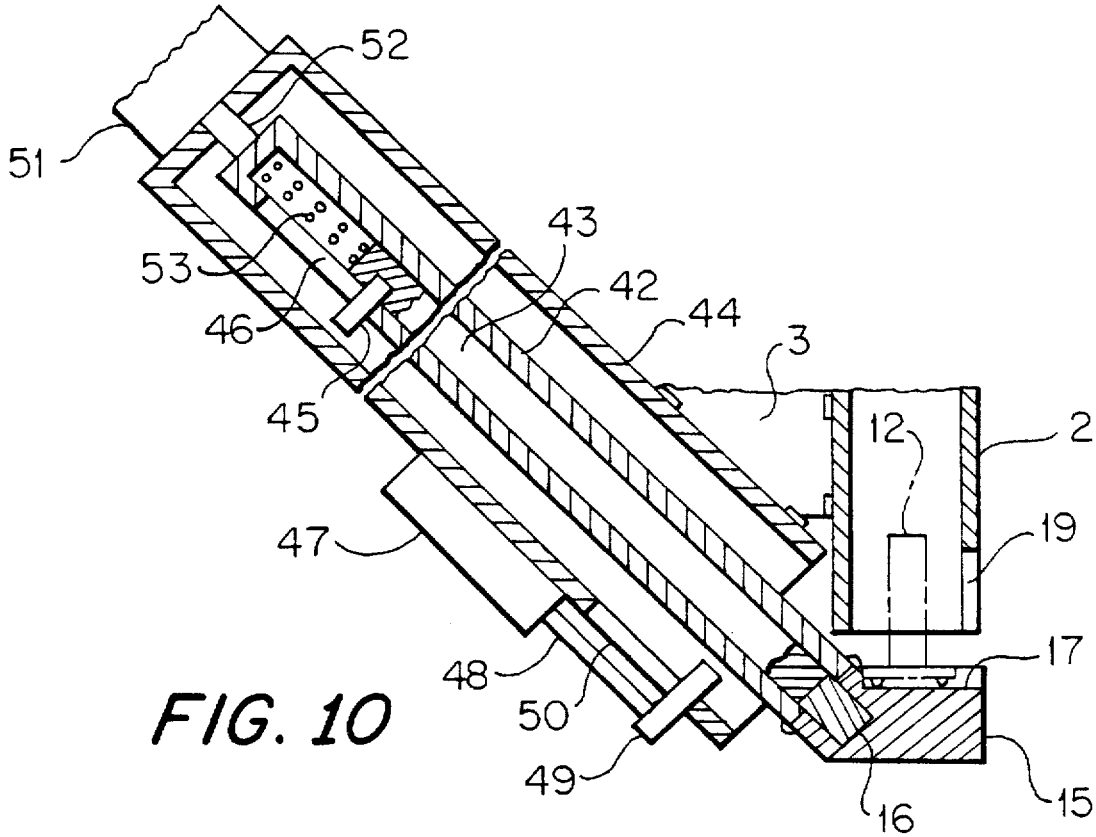
FIG. 10 is a side view, in longitudinal section, showing a modified example of an auxiliary feed rod.

FIG. 10 shows a magnet 16 embedded in the auxiliary feed rod 5. When the magnetic force on a part is to be nullified, the position of the magnet 16 is shifted. That is, the auxiliary feed rod 5 comprises an outer shaft 42 and an inner shaft 43 adapted to be reciprocated therein, and the magnet 16 is joined to the front end of the inner shaft 43, said magnet 16 being positioned in a support plate 15 (having a recess 17 and an arcuate portion 18 similar to those mentioned above) welded to the outer shaft 42. The auxiliary feed rod 5 is received in an outer sleeve 44, as shown, and a control pin 45 fixed to the inner shaft 43 extends through an elongated opening 46 formed in the outer shaft 42 to extend in the stroke direction. On the other hand, the outer peripheral surface of the outer sleeve 44 has an air cylinder 47 fixed thereto, the piston rod 48 thereof having an engaging element 49 joined thereto. The engaging element 49 projects into the outer sleeve 44 through an elongated opening 50 formed in the outer sleeve 44 to extend in the stroke direction. The amount of projection of this engaging element 49 is such that when the auxiliary feed rod 5 is advanced by a predetermined amount, the control pin 45 is stopped a little short of the engaging element 49. In addition, an air cylinder 51 is joined to the end of the outer sleeve 44, with its piston rod 52 connected to the end of the outer shaft 42. Further, a coil spring 53 is installed in the outer shaft 42 and its elastic force is limited by the control pin 45 abutting against the lower side of the elongated opening 46.

The operation of the device shown in FIG. 10 will now be described. When the positioning of the part 10 on the support plate 15 is effected by the magnet 16, the auxiliary feed rod 5 is advanced and stopped in the same manner as in FIG. 1. and is moved upward along the advance and retraction axis of the main feed rod, with the step portion 12 entering the receiving hole 25. Thereafter, when the engaging element 49 is raised by the action of the air cylinder 47, the displacement thereof is transmitted to the magnet 16 through the inner shaft 43, whereby the magnet 16 is moved away from the part 10; thus, the task of holding of the part 10 is transferred to the main feed rod. In addition, the advance movement of the main feed rod 20 may be a two-step motion; at the first stroke the stem portion 12 enters the receiving hole 25 and then, after the support plate 15 is retracted, the advance stroke at the second step is effected.

Such can also be employed in FIG. 1, and in the case of FIG. 4, the invention can be embodied without involving the upward displacement indicated by the arrow 35.

Figure 11:
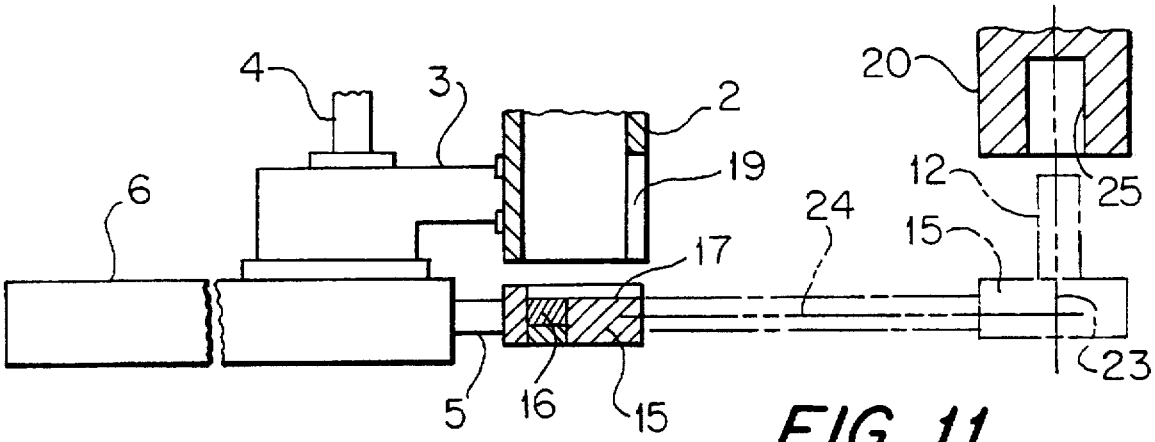
FIG. 11 is a side view in longitudinal section, wherein the advance and retraction axes of the main and auxiliary feed rods are orthogonal to each other.

FIG. 11 shows an arrangement wherein the advance and retraction axes 23 and 24 of the main and the auxiliary feed rods 20 and 5 are orthogonal to each other and hence the installation direction of the air cylinder is set to coincides therewith.

Figure 12:
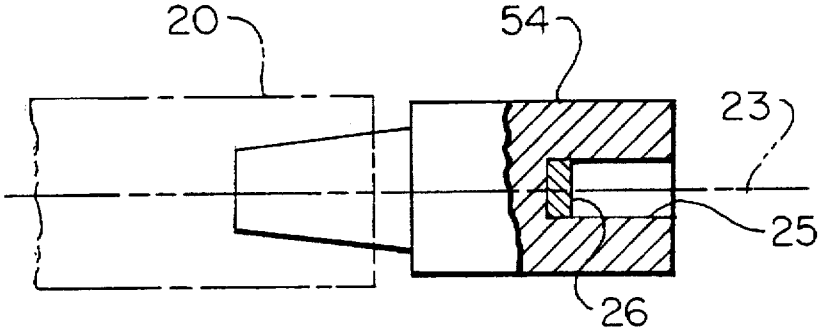
FIG. 12 is a side view wherein the main feed rod is a movable electrode for a projection welding machine.

FIG. 12 horizontally indicates the main feed rod 20 which in this case is the movable electrode of a projection welding machine. An electrode tip 54 is connected to the main feed rod 20 shown in phantom lines, said tip 54 being provided with a receiving hole 25 and a magnet 26.

According to the invention, since the part is held in advance at a fixed position on the auxiliary feed rod, the relative positions of the auxiliary feed rod and the part are established and since, in this held state, the part is stopped on the advance and retraction axis of the main feed rod, the part is always accurately set on the advance and retraction axis main feed rod. Therefore, there is no need to simultaneously effect the holding and positioning of a part fed onto the axis of the feed rod through a feed hose by a single mechanism, as described in the paragraph of the prior art; thus, the initial positioning on the advance and retraction axis of the main feed rod, which forms the basis of the operation, can be accurately effected.

In that the device having the effects described above is employed as a movable electrode for a projection welding machine, the welding of projection bolts can be completed at the same time as they are fed to a mating iron sheet or the like, a fact which is effective from the standpoint of productivity.

Since the advance and retraction axes of the main and auxiliary feed rods cross each other at an acute angle, the auxiliary feed rod can be advanced from an oblique direction so that the device can be effectively employed even in an environment where the peripherals are intricate.

Further, since the holding capacity is imparted to both rods or to one of them by using a magnet, the holding means is compact. Further, in the case where the main feed rod is an electrode for projection welding, a permanent magnet is disposed in the innermost region of the receiving hole and hence the amount of heat transmitted to the magnet is minimized, so that thermal effects on the magnet can be avoided.

Since either the auxiliary feed rod alone or both said rod and the parts feeding rod can be advanced and retracted along the advance and retraction axis of the main feed rod, the part positioned on said advance and retraction axis can be smoothly inserted into the receiving hole in the main feed rod.

Since the driving mechanism is designed so that as the auxiliary feed rod is moved upward or downward, the part is advanced into the receiving hole in the main feed rod and the auxiliary feed rod is moved away from the advance and retraction axis of the main feed rod, it is possible to hasten the start of operation of the main feed rod, a fact which is effective for increasing productivity.

What is claimed is:

1. A parts feeding apparatus comprising:

a main feed rod reciprocating along a first axis and having a recess formed therein for receiving a part delivered to a transfer point along the first axis;

an auxiliary feed rod reciprocating within a sleeve along a second axis, which intersects the first axis, and forms an acute angle therewith;

means for supplying the part to a preselected pickup point along the second axis;

means fixed to an outward end of the auxiliary feed rod, for removably retaining the part, when the outward end is displaced to the pickup point;

[means for connecting the sleeve to the part supplying means;]

means for [jointly] displacing the sleeve [and part supplying means] along a direction parallel with the first axis;

means for extending the auxiliary rod relative to the sleeve, along the second axis, until the part is located at the transfer point along the first axis;

[means for displacing the main feed rod to achieve engagement of the part by the main feed rod at the transfer point along the first axis;] and means located in the recess of the main feed rod for releasably retaining the part [while the displacing mean continues movement of the retained part beyond the engagement point].

2. The apparatus set forth in claim 1 wherein the main feed rod is an electrode of a projection welding machine.

3. The apparatus set forth in claim 1 wherein the means fixed to an outward end of the auxiliary feed rod for removably retaining the part, includes a magnet.

4. The apparatus set forth in claim 1 wherein the means located in the recess of the main feed rod for releasably retaining the part is a magnet.

* * * * *